March 17, 1964    F. HAUG ETAL    3,125,039
METERING DEVICE FOR A DOUGH KNEADING MACHINE
Filed Feb. 24, 1961
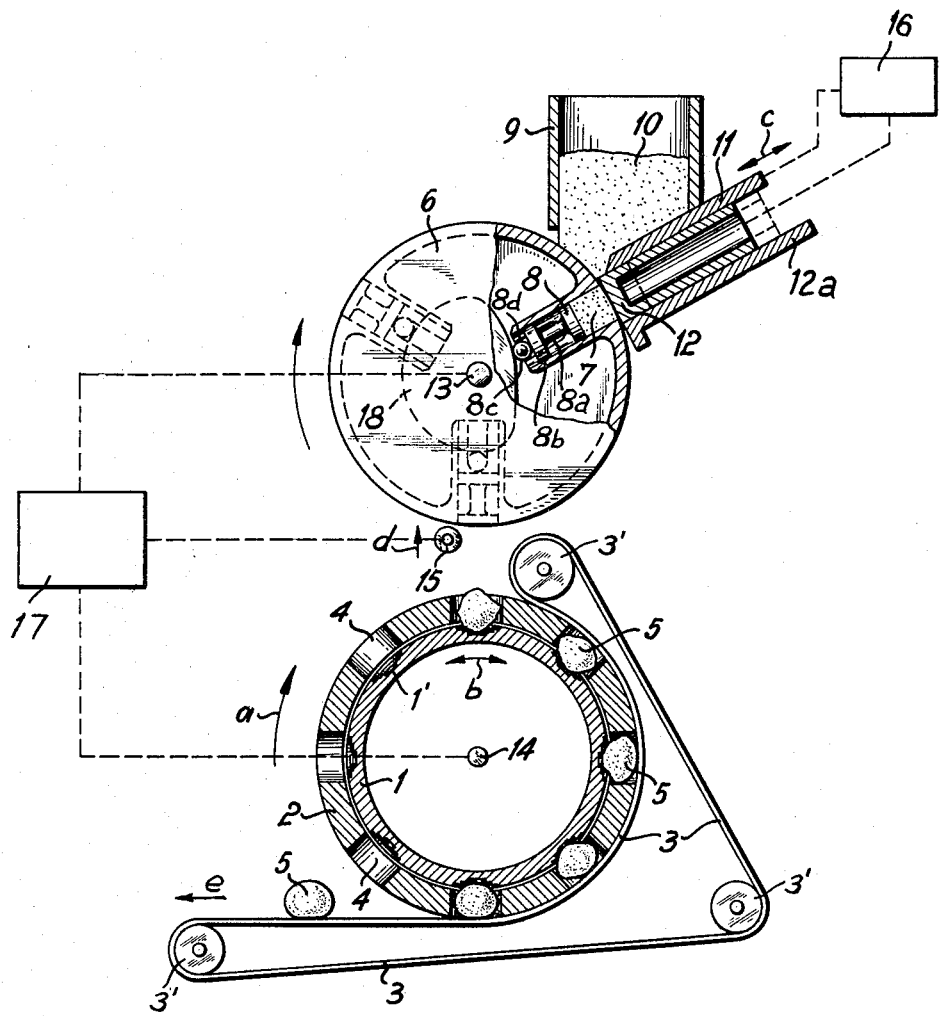
INVENTORS
FRIEDRICH HAUG
MAX STÜDLEIN
MANFRED WOLFF
BY Hane and Nydick
ATTORNEYS United States Patent Office  
3,125,039  
Patented Mar. 17, 1964

3,125,039
METERING DEVICE FOR A DOUGH KNEADING MACHINE
Friedrich Haug, Stuttgart-Weilimdorf, Max Stüdlein, Stuttgart, and Manfred Wolff, Grunbach, Kreis Waiblingen, Germany, assignors, by mesne assignments, to Werner & Pfleiderer G.m.b.H., Zug, Switzerland
Filed Feb. 24, 1961, Ser. No. 91,525
Claims priority, application Germany Feb. 27, 1960
6 Claims. (Cl. 107—9)

The present invention relates to feeding and portioning devices for dough kneading machines, and more particularly, to feeding and portioning devices for dough round kneading machines of the kind wherein an inner horizontally disposed kneading drum having in its outer wall one or several rows of circumferentially spaced recesses and a coaxially mounted outer kneading drum having a corresponding number of rows of circumferentially spaced transverse openings in its wall. The drums are rotated in the same direction, the inner drum also performing rotational and axial reciprocatory motions in reference to the outer drum. The openings in the outer drum constitute kneading chambers in which dough portions are kneaded by the relative rotational and axial motions of the two drums.

Feeding and portioning devices of the general kind above referred to serve to supply successive uniform quantities of dough to the kneading machine, but such devices as heretofore known, are not satisfactory as to the accuracy with which successive quantities of dough are metered by the device. Furthermore, with devices and machines as heretofore known it occurs not infrequently that portions of the metered dough pieces do not actually reach the kneading chambers of the machine due to being squeezed off during the passage from the portioning device to the machine, or leave the kneading machine prematurely due to being caught in moving parts of the machine. A further disadvantage of feeding devices as heretofore known is that the same are rather sensitive to changes in the consistency of the dough to be kneaded. The resulting inaccuracy of the metering reduces considerably the economy of the operation.

It is the broad object of the present invention to provide a novel and improved dough feeding and portioning device for dough kneading machines of the general kind above referred to, by means of which successive uniform quantities of dough are fed from the device to the kneading chambers of the machine for round kneading therein.

A more specific object of the invention is to provide a novel and improved dough feeding and portioning device including means by which metered uniform quantities of dough are transferred to the kneading machine without partial loss of dough during such transfer.

Another specific object of the invention is to provide a novel and improved dough feeding and portioning device which assures a rapid transfer of the metered dough from the device to the kneading machine and which effectively prevents any part of the metered dough from accidentally leaving a kneading chamber.

The aforedescribed objects and features of the invention and other objects and features which will be more fully described hereinafter, afford among others the advantage that products baked from the kneaded dough are of practically equal size and that the metered dough quantities, being always equal, undergo the same kneading action. This readily permits the kneading of dough of different type and consistency in the same machine, such as dough for rolls, doughnuts or zweiback. The feeding and portioning device according to the machine also greatly reduces the percentage of rejects, thus correspondingly increasing the economy of the operation.

The single figure of the accompanying drawing shows by way of illustration and not by way of limitation a preferred embodiment of the invention in diagrammatic form. Only those parts of the feeding and portioning device and of the round kneading machine that are essential for the understanding of the invention are shown.

The kneading machine comprises an inner drum 1 and and an outer drum 2. The two drums are rotational about a common horizontally disposed shaft 14 and are driven in the same direction, indicated by an arrow $a$. In addition, the inner drum performs circumferential reciprocatory motions indicated by arrow $b$ in reference to the outer drum and also reciprocatory axial motions, that is motions perpendicular of the plane of the drawing.

The peripheral outer wall of the inner drum is formed with one or several rows of circumferentially spaced, preferably stepped circular recesses 1'. The outer drum has in its peripheral wall corresponding rows of transverse openings 4 constituting kneading chambers. Dough pieces 5 fed into the kneading chambers and retained therein for part of the circumference of the outer drum are subjected to a round kneading action by the aforedescribed relative motions of the inner drum and the outer drum. The means for retaining the dough pieces in the kneading chambers are shown as a band conveyor 3 guided over pulleys 3' and driven in a suitable manner in the direction indicated by arrow $b$. As is shown, conveyor 3 envelops about approximately the right half of the circumference of drum 2, the conveyor also serving as a transport conveyor for finished dough portions to convey the same to a station for further processing. The kneading machine as described so far is generally conventional.

The feeding and portioning device according to the invention is disposed above the kneading machine. It comprises a rotary drum or disc 6 seated on a shaft 13 which is shown to be parallel to shaft 14 and disposed in a common vertical plane with that shaft. Drum 6 has in its peripheral wall feeding chambers 7, three radially disposed chambers being shown. The capacity of each of the chambers 7 is adjustable and for this purpose the bottom of each chamber is formed by a plunger 8. Each plunger is mounted on a plunger rod 8a terminating in a disc 8b against which abuts a cam follower 8c guided in a slot 8d. Obviously, the stroke of plunger 8 within the feeding chamber, that is, the radial distance between the outermost position of plunger 8 in reference to the periphery of drum 6, and the innermost position of the plunger in reference to that periphery, may be controlled by limiting the radially inward movement of the plunger discs 8 and 8b. As is equally obvious, the length of the stroke of the plunger controls the loading capacity of the feeding chamber 7.

The radial position of the plunger assembly in its feeding chamber is controlled by a cam disc 18 disposed coaxial with shaft 13. The configuration of the camming surface of disc 18 is such that the cam disc will successively force the plunger assembly from the position shown for the feeding chamber illustrated in full lines which is the feeding position, to the position shown for the downwardly facing feeding chamber in dotted lines which is the discharge position. As may be noted, in the latter position the face of plunger 8 is substantially flush with the periphery of drum 6.

Feeding chambers 7 are charged by means of a reciprocatory pusher 12 guided on a guide member 12a and movable between a forward position shown in full lines and a withdrawn position shown in dotted lines. When the pusher is in its withdrawn position, dough is fed in front of it from a dough supply 10 in a hopper 9. The quantity of dough fed each time in front of the pusher is metered by a knife 11 which performs reciprocatory motions in the directions indicated by arrow c. As is evident, the forward motion of pusher 12 will press the metered quantity of dough into a feeding chamber 7 in alignment with the pusher.

The reciprocatory motions of knife 11 and pusher 12 are derived from control and drive means 16. Such control and drive means are well known in the art; they do not constitute part of the invention and are, hence, only diagrammatically indicated.

The rotation of kneading drums 1 and 2 and of metering drum 6 are derived from a drive and control means 17. The relative rate of rotation of the kneading drums and the metering drum are so correlated that a kneading chamber 4 to be charged is in its uppermost position each time a feeding chamber 7 reaches a downwardly facing position. Control and drive means suitable for the purpose are well known in the art; they do not constitute part of the invention and are, hence, only diagrammatically indicated. As is shown, chambers 4 and 7 rotate in the same plane, but chambers 7 may also rotate in a different plane, provided a chamber 7 and a chamber 4 meet in the required up and down positions.

As is evident, the dough contained in a downwardly facing chamber 7 is extruded from such chamber by plunger 8 and drops into the kneading chamber 4 directly beneath it. As the kneading drums continue their rotation in clockwise direction, the kneading chamber just charged will move beneath the band conveyor 3, which thus closes the kneading chamber. To prevent a partial dribbling of dough out of a kneading chamber before the same is closed by band 3, the band engages the circumference of drum 2 as closely as practical to the position in which a kneading chamber is charged. As is seen in the figure, band 3 engages drum 2 just posterior of a kneading chamber in its uppermost position.

To facilitate and accelerate the transfer of dough from a feeding chamber 7 to a kneading chamber 4 a stripper roll 15 is provided just posterior of the position at which a chamber 7 is discharged. Roll 15 is rotated at a comparatively high speed in the direction indicated by arrow d. It tends to pull the dough downwardly and thus effectively prevents a delay or partial loss of the dough. The drive for roll 15 may also be derived from drive means 17.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A dough feeding and portioning device for a dough kneading machine of the kind wherein an inner horizontally disposed rotary kneading drum having in its outer wall a row of circumferentially spaced recesses and a coaxially mounted outer rotary kneading drum having a corresponding row of transverse circumferentially spaced openings in its wall are rotated in the same direction, whereby the inner drum also performs rotational and axial reciprocatory motions in reference to the outer drum, the openings in the outer drum constituting kneading chambers in which dough portions are kneaded by the relative rotational and axial motions of the two drums, said device comprising a rotary dough metering means rotatably mounted above said kneading drums rotatable about an axis parallel to the rotational axis of the kneading drum, said axes being situated in a common perpendicular plane, said metering drum having a peripheral outer wall portion including several spaced dough feeding chambers, said feeding chambers being rotational in a plane in which successive downwardly facing feeding chambers are aligned with successive upwardly facing kneading chambers in a perpendicular plane, dough feeding means charging successive feeding chambers of the metering means with dough, dough discharge means discharging the dough from a charged feeding chamber and into the respective kneading chamber when the latter occupies said upwardly facing perpendicular position, a dough retaining and transporting band conveyor driven in the rotational direction of the kneading drums and engaging the periphery of said outer kneading drum at a point closely adjacent to and posterior of the position occupied by a kneading chamber in its upwardly facing position and enveloping part of the circumference of the outer drum, and a rotary stripper means disposed closely adjacent and posterior to the position occupied by a feeding chamber in its downwardly facing position as seen in the direction of the rotation of the metering means, said stripper means engaging dough discharged from the respective feeding chamber to facilitate passage of the dough into the respective kneading chamber.

2. A dough feeding and portioning device according to claim 1 wherein said feeding chambers in the peripheral wall of the drum are circumferentially spaced and disposed in axial row arrangement.

3. A dough feeding and portioning device according to claim 1 wherein said feeding chambers are defined by wall portions of the drum adjustable in reference to each other to vary the capacity of said feeding chambers.

4. A dough feeding and portioning device according to claim 1 wherein said metering means comprises a rotary drum including in its peripheral wall said feeding chambers in radial orientation, and wherein said dough discharge means comprise a plunger in each of said feeding chambers slidable between a radially withdrawn position and a radially forward position, said withdrawn position constituting a charging position and said forward position the extrusion position of the plunger, each of said plungers supporting a cam follower, and a cam disc mounted within the metering drum and coacting with said followers to move the plungers alternately and successively from said one position into said other position in accordance with the rotation of the metering drum about the cam disc, each of said plungers occupying said extrusion position when the respective feeding chamber is in its downwardly facing position.

5. A dough feeding and portioning device according to claim 4 wherein said dough feeding means comprise a reciprocatory dough pusher, a guide means for said pusher, dough supply means feeding successive predetermined quantities of dough in front of said pusher, movement of said pusher toward said metering drum pressing the dough in front of the pusher into a feeding chamber in alignment with said pusher.

6. A dough-feeding and portioning device according to claim 1 and comprising drive means for rotating said kneading drums, said rotary stripper being driven at a higher rate of rotation than said kneading drums and said metering means.

References Cited in the file of this patent

UNITED STATES PATENTS

| 888,412 | Thomson | May 19, 1908 |
| 1,678,747 | Scholz | July 31, 1928 |
| 2,286,983 | Beutel | June 16, 1942 |

FOREIGN PATENTS

| 136,544 | Austria | Feb. 10, 1938 |

OTHER REFERENCES

Werner & Pfleiderer, German printed application 1,082,202, May 25, 1960. (Corresponding U.S. Knecht et al. 3,049,084, Aug. 14, 1962.)